United States Patent [19]
Bland et al.

[11] Patent Number: 5,623,697
[45] Date of Patent: Apr. 22, 1997

[54] BRIDGE BETWEEN TWO BUSES OF A COMPUTER SYSTEM WITH A DIRECT MEMORY ACCESS CONTROLLER HAVING A HIGH ADDRESS EXTENSION AND A HIGH COUNT EXTENSION

[75] Inventors: Patrick M. Bland, Austin, Tex.; Daniel R. Cronin, III, Lake Worth, Fla.; Richard G. Hofmann, Cary, N.C.; Dennis Moeller; Lance M. Venarchick, both of Boca Raton, Fla.

[73] Assignee: International Business Machines Corporation, Armonk, N.Y.

[21] Appl. No.: 350,165

[22] Filed: Nov. 30, 1994

[51] Int. Cl.⁶ .................................................. G06F 13/28
[52] U.S. Cl. ...................... 395/842; 395/308; 395/309; 395/823
[58] Field of Search ..................................... 395/325, 842, 395/821, 823, 308, 309, 848, 307, 311

[56] References Cited

U.S. PATENT DOCUMENTS

| | | | |
|---|---|---|---|
| 4,695,948 | 9/1987 | Blevins et al. | 364/200 |
| 4,716,527 | 12/1987 | Graciotti | 364/200 |
| 4,849,875 | 7/1989 | Fairman et al. | 395/846 |
| 5,043,877 | 8/1991 | Berger et al. | 364/200 |
| 5,101,339 | 3/1992 | Fairman et al. | 395/402 |
| 5,113,369 | 5/1992 | Kinoshita | 395/325 |
| 5,148,539 | 9/1992 | Enomoto et al. | 395/307 |
| 5,170,477 | 12/1992 | Potter | 395/411 |
| 5,265,211 | 11/1993 | Amini et al. | 395/85 L |
| 5,280,590 | 1/1994 | Pleva et al. | 395/325 |
| 5,392,406 | 2/1995 | Petersen et al. | 395/311 |
| 5,392,407 | 2/1995 | Heil et al. | 395/325 |
| 5,396,602 | 3/1995 | Amini et al. | 395/325 |
| 5,404,481 | 4/1995 | Miyamori | 395/842 |
| 5,444,857 | 8/1995 | Rowland | 395/309 |
| 5,448,521 | 9/1995 | Curry et al. | 365/189.02 |
| 5,450,551 | 9/1995 | Amini et al. | 395/299 |
| 5,455,915 | 10/1995 | Coke | 395/325 |
| 5,465,332 | 11/1995 | Deloye et al. | 395/842 |
| 5,471,590 | 11/1995 | Melo et al. | 395/288 |
| 5,530,901 | 6/1996 | Nitta | 395/848 |

*Primary Examiner*—Christopher B. Shin

[57] ABSTRACT

A system having an industry standard architecture (ISA) bus with a 24-bit memory addressing capacity and a peripheral controller interconnect (PCI) bus with a 32-bit memory addressing capacity, is provided with a bridge coupled between the ISA and PCI buses. The bridge has a direct memory access (DMA) controller circuit that generates 32-bit memory addresses for DMA transfer operations over the PCI bus. The DMA controller circuit includes a pair of cascaded DMA controllers that generate the 16 least significant bits of the 32-bit memory addresses, and address extension logic having a low page register that provides the 8 next most significant bits of the 32-bit memory addresses, and a high page register that provides the 8 most significant bits of the 32-bit memory addresses. The 16 bits provided by the low and high page registers are concatenated with the lower 16 bits to form the 32-bit addresses. The DMA controller circuit is also provided with count extension logic that increases the transfer count from a 16-bit number to a 24-bit number, so that larger segments of memory may be moved in the individual DMA transfers.

8 Claims, 7 Drawing Sheets

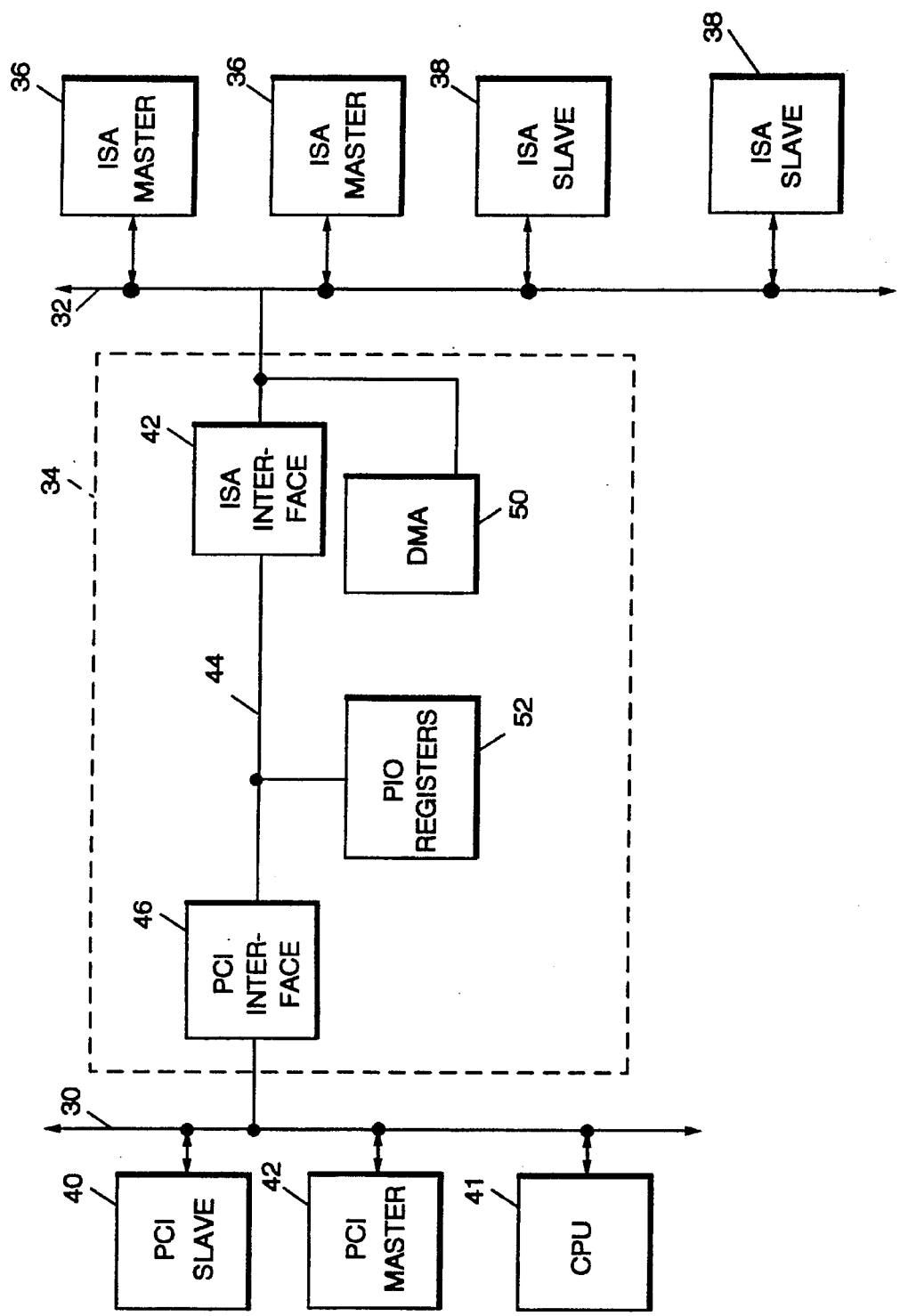

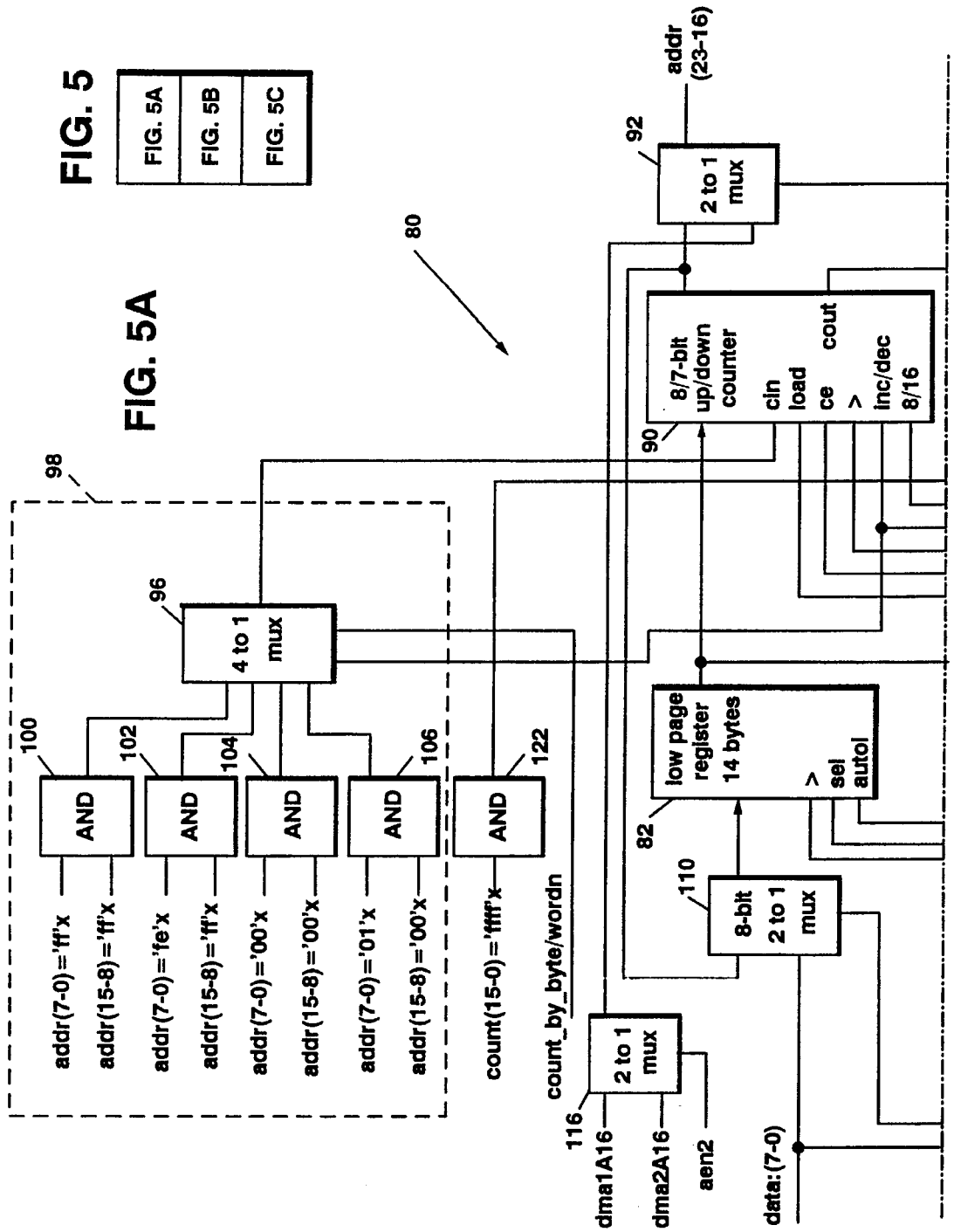

BRIDGE BETWEEN TWO BUSES OF A COMPUTER SYSTEM WITH A DIRECT MEMORY ACCESS CONTROLLER HAVING A HIGH ADDRESS EXTENSION AND A HIGH COUNT EXTENSION

BACKGROUND OF THE INVENTION

1. Field of the Invention

The present invention relates to the field of digital computer systems, and more particularly, to the addressing of memory within a system which has two or more buses of different memory addressing capacities.

2. Description of Related Art

In computer systems, electronic chips and other components are connected with one another by buses. A variety of components can be connected to the bus, providing intercommunication between all of the devices that are connected to the bus. One type of bus which has gained wide industry acceptance is the industry standard architecture (ISA) bus. The ISA bus has twenty-four (24) memory address lines which therefore provides support for up to sixteen (16) megabytes of memory. The wide acceptance of the ISA bus has resulted in a very large percentage of devices being designed for use on the ISA bus. However, higher-speed input/output devices commonly used in computer systems require faster buses. A solution to the general problem of sending and receiving data from the processor to any high-speed input device is a local bus. Unlike the ISA bus, which operates relatively slowly with limited bandwidth, a local bus communicates at system speed and carries data in 32-bit blocks. Local bus machines remove from the main system bus those interfaces that need quick response, such as memory, display, and disk drives. One such local bus that is gaining acceptance in the industry is the peripheral component interconnect (PCI) bus. The PCI bus can be a 32 or 64-bit pathway for high-speed data transfer. Essentially, the PCI bus is a parallel data path provided in addition to an ISA bus. The system processor and memory can be attached directly to the PCI bus, for example. Other devices such as graphic display adapters, disk controllers, sound cards, etc. can also attach directly or indirectly (e.g., through a host bridge) to the PCI bus.

A bridge chip is provided between the PCI bus and the ISA bus in order to provide communication between devices on the two buses. The bridge chip essentially translates the ISA bus cycles to PCI bus cycles, and vice versa.

Many of the devices attached to the PCI bus and the ISA bus are master devices that can conduct processing independently of the bus or other devices. Certain devices coupled to the buses are considered to be slaves or targets that accept commands and respond to requests of a master. The PCI bus has an addressing capability of 32 bits to provide for 4 gigabytes of memory access. A master on the ISA bus can access a memory location in the memory on the PCI bus, although normally only within the lowest 16 megabyte region due to the 24-bit addressing of the ISA bus masters.

In a digital computer, a microprocessor operates on data stored in a main memory. Since there are practical size limitations on the main memory, bulk memory storage devices are provided in addition to and separately from the main memory. When the microprocessor wants to make use of data stored in bulk storage, for example, a hard disk, the data is moved from the hard disk into the main memory. This movement of blocks of memory inside the computer is a very time consuming process and would severely hamper the performance of the computer system if the microprocessor were to control the memory transfers itself.

In order to relieve the microprocessor from the chore of controlling the movement of blocks of memory inside the computer, a direct memory access (DMA) controller is normally used. The DMA controller receives information from the microprocessor as to the base location from where bytes are to be moved, the address to where these bytes should go, and the number of bytes to move. Once it has been programmed by the microprocessor, the DMA controller oversees the transfer of the memory data within the computer system. Normally, DMA operations are used to move data between input/output (I/O) devices and memory.

A commercially available DMA controller is the 8237 DMA controller manufactured by Intel. Each 8237 DMA controller provides four separate DMA channels which can be used independently for memory transfers. Certain well-known computer systems, such as the IBM PC/AT design, contain two 8237 DMA controllers. One channel of the first DMA controller is used to cascade the second DMA controller. The pair of DMA controllers therefore provide a total of seven DMA channels, with four channels provided by the first controller, and three channels provided by the second controller.

In the IBM PC/AT design, the lower order 16 bits of the memory address (15:0) are produced by the 8237 DMA controllers, and the upper 8 bits (23:16) are provided by a low page register that is loaded with values for the individual channels during programming of the DMA controllers. A prior art solution for addressing memory above the 16 megabyte limit uses external circuitry to set the most significant bit of a 32-bit PCI address high, when a master signal is detected on the ISA bus. This reallocated the 16 megabytes of memory to a different location within the 4 gigabytes of memory. However, all accesses to the memory on the PCI bus by the ISA bus masters would be to this same reallocated segment. There is therefore not a true addressability to the entire 4 gigabyte memory space by the ISA bus masters in the prior art system.

Another limitation of the prior art design of the IBM PC/AT DMA controller circuit is the boundary crossing limitation, which does not allow incrementing or decrementing across certain boundaries. For example if a boundary exists between bits 3 and 4 of an 8-bit byte (7:0), then if a first address is 00001111, an increment to a next address should cause a 1 to cross the boundary for a new address of 00010000. However, in the prior art arrangement, boundary crossings were not permitted. A boundary was normally present between the lower two bytes and the uppermost byte of the 24-bit memory address.

In addition to the memory address, another aspect of each DMA transfer is the transfer count, which indicates how large a transfer will be made. The prior art limits the transfer count to a 16 bit number, so that the largest possible transfer is a 64K byte block. This constraint hinders system performance since each transfer is limited to this size block, so that if a larger transfer is desired, it must be performed in separate 64K byte block transfers, with programming of the DMA controller needed for each transfer.

SUMMARY OF THE INVENTION

There is a need for an arrangement which extends the memory addressing capability of bus masters coupled to a first bus and that have a first memory addressing capability, to allow them to access any memory location on a second bus that has a larger memory than can otherwise be addressed by a bus master having the first memory addressing capability. Furthermore, there is a need for an arrangement which extends the size of a transfer count in the system.

These and other needs are met by the present invention which provides a bridge for interfacing the buses of a computer system that has a first bus having M-bit memory addressing capacity and a second bus having N-bit memory addressing capacity, the bridge comprising a first bus having M-bit memory addressing capacity, a second bus having N-bit memory addressing capacity, and a bridge coupled between the first and second buses. The bridge has a direct memory access (DMA) controller circuit that generates M-bit memory addresses for DMA transfer operations. The DMA controller circuit includes a pair of cascaded DMA controllers that generate P bits of the M-bit memory addresses, and address extension logic having a low page register that provides Q bits of the M-bit memory addresses, and a high page register that provides R bits of the M-bit memory addresses, the Q and R bits concatenated with the N bits to form the M-bit addresses, where P+Q+R=M.

In certain preferred embodiments of the invention, logic is provided for incrementing and decrementing the M-bit memory addresses during DMA transfer operations. A boundary exists between the most significant bit of the P bits and the least significant bit of the Q bits, the P bits forming the first and second bytes of the M-bit addresses, the Q bits forming the third byte of the M-bit addresses, and the R bits forming the fourth byte of the M-bit addresses, the first byte being the least significant and the fourth byte being the most significant of the M-bit addresses. Boundary crossing detection logic detects when incrementing or decrementing the M-bit addresses will cause a boundary crossing between the second and third bytes.

The present invention provides the advantages of using a conventional pair of cascaded DMA controllers that have previously been used in connection with ISA buses, and extending the addressing capability of the DMA controllers with low and high page registers to provide addressing capability compatible with PCI buses. Boundary crossings in the upper bytes of the addresses are detected and accounted for by the boundary crossing detection logic, to allow incrementing and decrementing across any boundary.

In certain embodiments of the present invention, the pair of cascaded DMA controllers generates a P-bit transfer count, and the DMA controller circuit further includes count extension logic that provides Q bits that are concatenated with the P-bit transfer count to form a T-bit transfer count, where P+Q=T. The count extension logic allows larger segments of memory to be transferred in the individual DMA transfers since the transfer count can be a larger number than previously possible due to the additional bits.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram of the computer system of FIG. 1 constructed in accordance with an embodiment of the present invention.

FIG. 5 which is composed of individual FIGS. 5A, 5B and 5C, is a block diagram of an exemplary embodiment of the high address extension and high count extension logic.

DESCRIPTION OF THE ILLUSTRATIVE EMBODIMENTS

Figure 1:
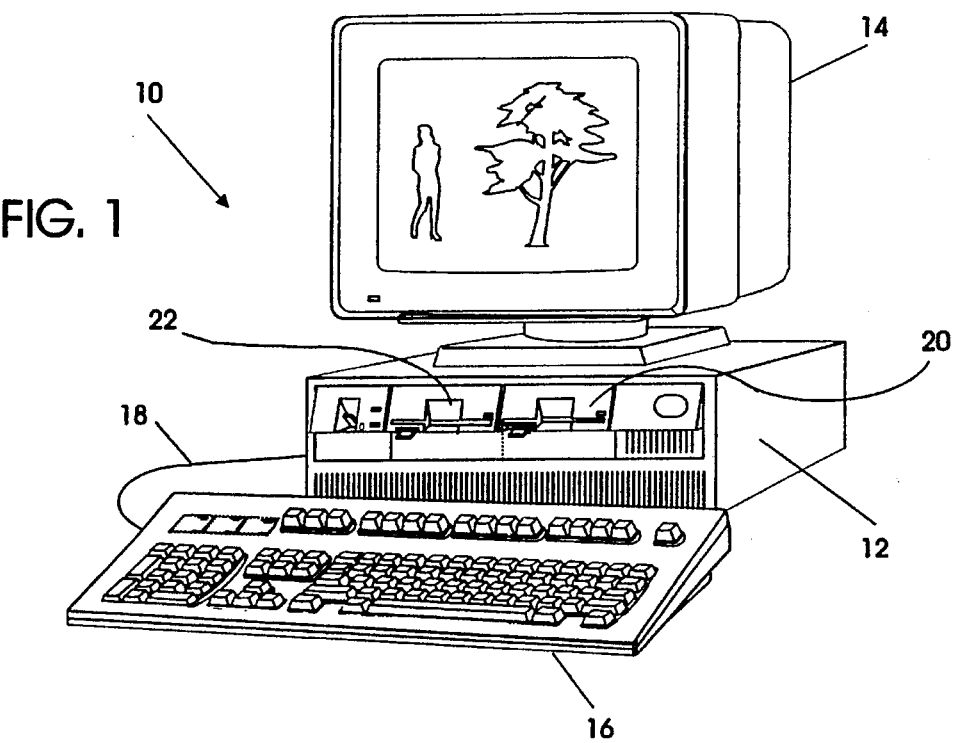
FIG. 1 is a perspective view of a computer system of the present invention.

With reference now to the Figures and in particular with reference to FIG. 1, a conventional computer, or PC, designated 10, is of the environment to which the invention has particular utility. Computer 10 which preferably, but not necessarily, is of a type utilizing an IBM personal computer or a similar system, includes a console housing 12 in which a circuit board containing the necessary circuitry including a microprocessor and BIOS chips, controllers, random access memory and other hardware are arranged. The computer will also include a video display 14 and a keyboard 16 connected to the housing 12 through cable 18. Mass storage media includes a hard disk drive within the housing and is non-accessible to the user, and user-accessible floppy disks, as well as, optionally, CD-ROM drives 20 and 22.

FIG. 2 is a block diagram of a computer system constructed in accordance with an embodiment of the present invention. The system includes a PCI bus 30, an ISA bus 32, with a plurality of ISA masters 36 and ISA slaves 38. A plurality of PCI memory slaves 40 are coupled to the PCI bus 30.

The bridge chip 34 contains an ISA interface 42 coupled between the ISA bus 32 and a system bus 44. A PcI interface 46 is provided between the PCI bus 30 and system bus 44. The bridge chip 34 also has a DMA controller 50 and programmable I/O (PIO) registers 52. The DMA controller 50 is coupled to the ISA bus 32. The bridge chip 34 provides an interface between the PCI bus 30 and the ISA bus 32.

The ISA bus interface 42 in the bridge chip 34 translates ISA bus cycles into system bus cycles for use by the bridge chip 34. The PCI bus interface 46 converts PCI bus cycles from the PCI bus 30 into system bus cycles for the bridge chip 34. The DMA controller 50 controls DMA control of memory accesses within the system. The DMA controller 50 provides a plurality of separate DMA channels over which memory accesses involving the individual ISA masters 36 are respectively communicated.

Either the DMA controller 50 or the ISA bus master 36 can generate transfer cycles, since the DMA controller 50 acts as a bus master on the ISA bus 32. Both the ISA master 36 and the DMA controller 50 can access memory located on either the ISA bus 32 or the PCI bus 30. For ease of explanation in the following description, however, examples will be described in which the ISA bus master 36 is generating transfer cycles. When this occurs, the DMA controller 50 acts as an arbitration device.

When the ISA bus master 36 generates a transfer cycle, the ISA bus master 36 produces a memory address. This is the starting address and indicates the designation of transfer data.

As stated earlier, the 32-bit addressing capability of the PCI bus 30 provides a memory addressing capacity of 4 gigabytes. By contrast, since an ISA bus master 36 can only generate 24-bit addresses, it is limited to addressing memory within a 16 megabyte segment. The prior art solution uses external circuitry to set the most significant bit of a 32-bit PCI address high, when a master signal is detected on the ISA bus 32. This reallocates the 16 megabytes of memory to a specific different location within the 4 gigabytes of memory. However, all accesses to the memory on the PCI bus 30 by the ISA bus masters 36 would be to this same location. By contrast, the present invention provides memory access to any memory location within the 4 gigabytes of memory addressable over the PCI bus 30.

Figures 3, 3A:
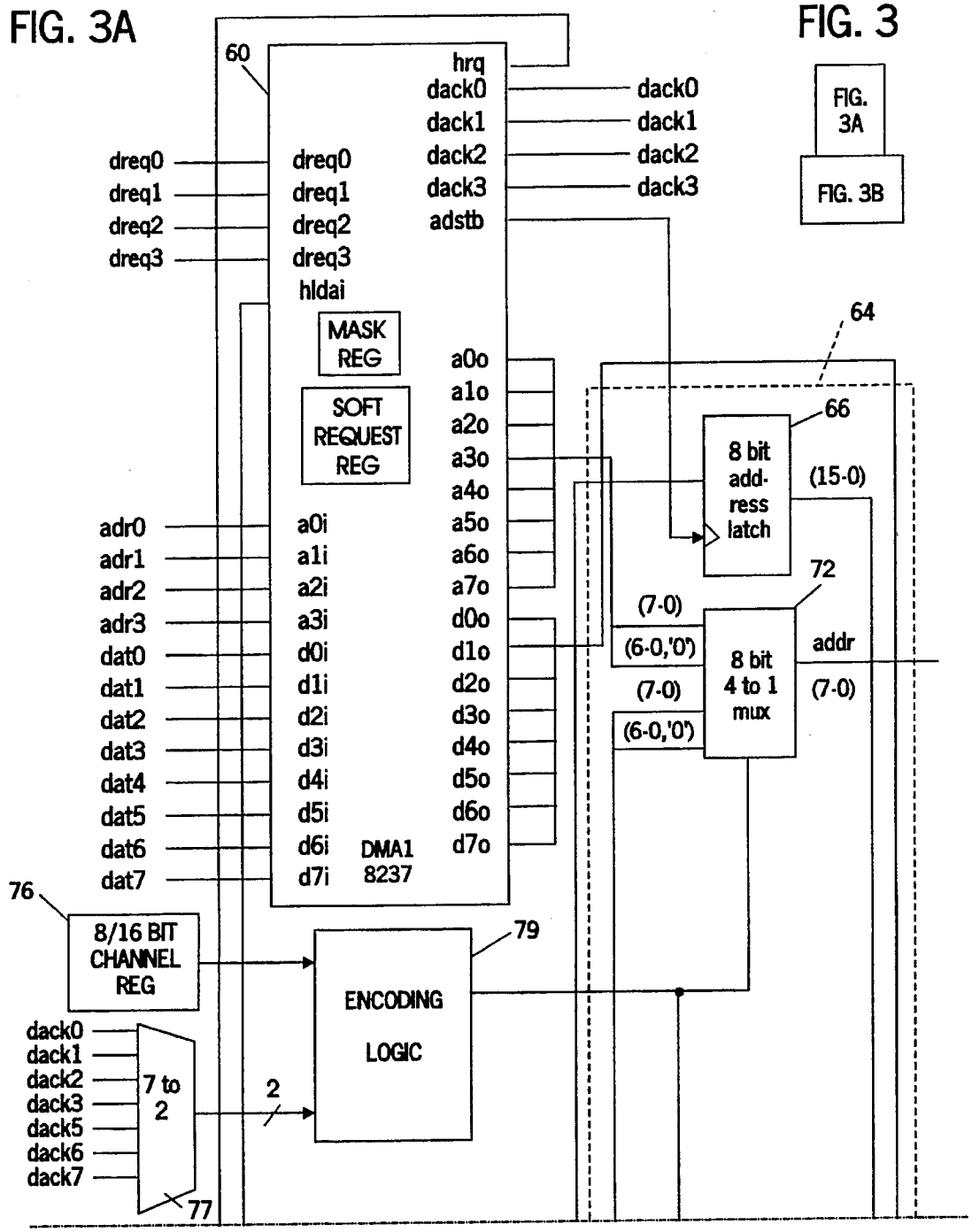
FIG. 3 which is composed of individual
FIGS. 3A and 3B, is a block diagram of an exemplary embodiment of a DMA control circuit constructed in accordance with an embodiment of the present invention.
Figure 3B:
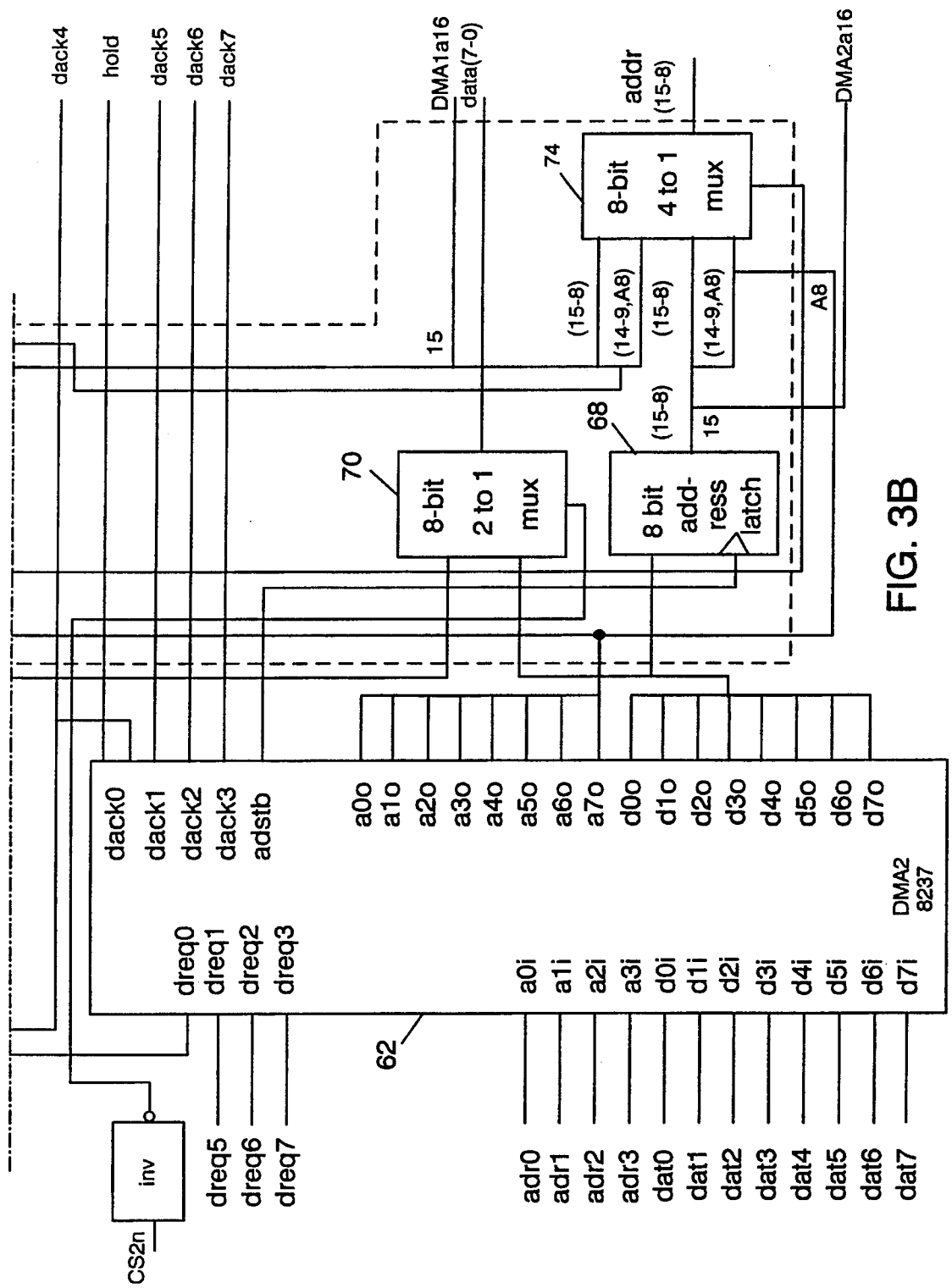

FIG. 3 is a block diagram of an exemplary embodiment of a DMA controller circuit 50 which provides dynamic configuration of the DMA channels. The DMA controller circuit 50 includes a pair of cascaded DMA controllers 60, 62 and a multiplexer circuit 64.

Preferred embodiments of the present invention use a commercially available DMA controller, such as the 8237 DMA controller manufactured by Intel. Each 8237 DMA controller provides four separate DMA channels which can be used independently for memory transfers. Certain well-known computer systems, such as the IBM PC/AT design, contain two 8237 DMA controllers. The DMA controller circuit 50 of FIG. 3 also uses two conventional DMA controllers 60, 62. One channel of the first DMA controller 60 is used to cascade the second DMA controller 62, as is known in the prior art. The pair of DMA controllers 60, 62 therefore provide a total of seven DMA channels, with four channels provided by the first DMA controller 60, and three channels provided by the second DMA controller 62.

A number of different signals, such as the clock signal, etc., have not been shown in FIG. 3 so as not to obscure the invention. However, one of ordinary skill in the art would recognize that these conventional signals would be used in practice.

The first and second DMA controllers 60, 62 produce sixteen bits (15:0) of the memory address to the PCI bus 30. As will be explained in more detail with respect to FIG. 5, the DMA controller circuit 50 also has a low page register, a high page register, and a high count register, although these registers can in certain embodiments be separate from the DMA controller circuit 50.

The first DMA controller 60 provides DMA channels 0–3 in response to request signals DREQ#0–DREQ#3. Addresses are programmed in the DMA controller 60 over lines ADR#0–ADR#3. Data is received over input lines DAT#0–DAT#7. Acknowledge signals are generated by the first DMA controller 60 as signals DACK#0–DACK#3.

The eight least significant bits of a 16-bit address are produced as output signals on pins A0–A7. The eight most significant bits of the 16-bit address are provided as outputs from D0–D7 when the address strobe signal ADSTB is enabled. When the address strobe is not enabled, the data signals are provided as the output from D0–D7. A hold request output (HRQ) from the first DMA controller 60 is coupled to the DREQ#0 input of the second DMA controller 62 and DACK#0 of the second DMA controller 62 is connected to the hold acknowledge input (hlda) of the first DMA controller 60 to provide the cascading of the pair of controllers 60, 62, as is well known in the art.

The second DMA controller 62 provides DMA channels 5–7 and receives DREQ#5–DREQ#7 at inputs DREQ#1–DREQ#3. The second DMA controller 62 provides at output pins DACK#1–DACK#3 the output signals DACK#5–DACK#7. The outputs of the address lines A0–A7 and data lines D0–D7 are the same as for the first DMA controller 60. Data lines D0–D7 receive as inputs DATA#0–DATA#7, the same as the first DMA controller 60. However, the second DMA controller 62 receives at inputs A0–A3 the signals ADR#1–ADR#4. This ensures that the first and second DMA controllers 60, 62 do not respond to the same I/O programming address.

The addresses generated by the first and second DMA controllers 60, 62 are received by the multiplexer circuit 64, shown in dashed lines. The multiplexer circuit 64 comprises two 8-bit address latches 66, 68, and 8-bit 2-to-1 multiplexer 70, and two 8-bit 4-to-1 multiplexers 72, 74.

The 8-bit 2-to-1 multiplexer 70 is a data multiplexer that receives the data signals D0–D7 from each of the first and second DMA controllers 60, 62. The data multiplexer 70 selects which set of data signals will be produced as output data (7–0) when reading the registers out of the first and second DMA controllers 60, 62.

When the data lines D0–D7 of the first and second DMA controllers 60, 62 are used as address lines for the most significant bits 15–8, these bits are latched in the respective 8-bit address latches 66, 68. The latches 66, 68 are under the control of the address strobe signal ADSTB from the first and second DMA controllers 60, 62.

The 8-bit 4-to-1 multiplexer 72 is a least significant bit multiplexer that produces as an output the least significant 8 bits of each address. The 8-bit 4-to-1 multiplexer 74 is a most significant bit multiplexer and produces the most significant bits 15–8 of each address.

The first multiplexer 72 has four inputs. At the first input are the least significant 8 bits of the address generated by the first DMA controller 60. At the second input, the first multiplexer 72 receives the least significant seven bits (6–0) of the least significant bits of the address generated by the first DMA controller 60. However, these bits are shifted to the left by one position and a zero is provided as the least significant bit of the 8-bits input into the multiplexer 72. The second input therefore represents the least significant bits of the memory address shifted by one position to the left, with a zero being placed into the least significant bit position. The third input of the first multiplexer 72 are the least significant 8 bits (7–0) of the unshifted memory address generated by the second DMA controller 62. The fourth input of the first multiplexer 72 receives a shifted memory address from the second DMA controller 62. This shifted memory address has been shifted in the same manner as the memory address received at the second input.

The second multiplexer 74 receives at its first input the most significant bits (15–8) of the address generated by the first DMA controller 60. These bits are provided by the 8-bit address latch 66. At its third input, the second multiplexer 74 receives the most significant bits (15–8) generated by addresses from the second DMA controller 62, through the 8-bit address latch 68. The second multiplexer 74 receives at its second and fourth inputs a shifted version of the most significant bits from the first and second DMA controllers 60, 62, respectively. In bit position 8, the output of address line A7 is provided. The upper seven bits in positions 15–8 are provided by bits (14–9) of the shifted memory address. Thus, the address bits provided at the second and fourth inputs correspond to bits (14–7) of the unshifted memory address, but shifted into positions 15–8. The second multiplexer 74 therefore receives the eight most significant bits of an unshifted memory address from each of the first and second DMA controllers 60, 62 and the eight most significant bits of a shifted memory address from each of the first and second DMA controllers 60, 62.

For reasons to be described later, it is necessary to preserve the shifted bit 15 so that the information contained in this bit is not lost. The shifted bit 15 is provided at outputs (one for each DMA controller 60, 62) as address bit 16 (DMA1A16, DMA2A16).

The DMA control circuit includes a programmable register 76 which contains information for each DMA channel as to whether that channel is an 8-bit channel or a 16-bit channel. The acknowledge signals (DACK#0–DACK#3; DACK#5–DACK#7) for the seven DMA channels are provided as inputs to a seven-to-two multiplexer 77 that produces an output signal that indicates which DMA controller 60 or 62 carries the DMA channel that will be used for the transfer. Based upon the information in the register 76 and the signal from the multiplexer 77, simple encoding logic 79 produces a select signal that causes the multiplexers 72, 74 to provide the required output.

In preferred embodiments of the invention, upon system power-up, the register 76 defaults to the IBM PC/AT design of configuring DMA channels 0–3 as 8-bit channels and DMA channels 5–7 as 16-bit channels.

Two examples of operation will be described. Assume for the first example that DMA channel 5 is currently programmed in the DMA control circuit to be an 8-bit channel. When a DMA control cycle is performed, only unshifted memory address should be produced as an output from the DMA control circuit. The signal from the encoding logic 79 corresponding to DMA channel 5 being an 8-bit channel causes the first multiplexer 72 to select the third input having the least significant bits (7–0) of the unshifted memory address in the second DMA controller 62 to be produced at the multiplexer output as address (7–0). The same control signal causes the second multiplexer 74 to select the most significant 8-bits of the unshifted memory address from the second DMA controller 62 to produce at the multiplexer output the address bits (15–8). Since these bits have not been shifted from the address generated by the second DMA controller 62, either odd or even accesses to memory are possible, thereby providing 8-bit memory accesses.

In the second example, the DMA channel 2 is programmed to be a 16-bit channel provided by the first DMA controller 60. The control signal from the encoding logic 79 causes the multiplexer 72 to select the second input which corresponds to the least significant bits of the shifted memory address and a zero in the least significant position. This is provided at the multiplexer output as address bits (7–0) of a memory access. The control signal also causes the second multiplexer 74 to select the most significant bits of the shifted memory address (second input) to be produced as the output address bits (15–8).

The above are examples only, as DMA channel 5 can be readily programmed to be a 16-bit channel, while DMA channel 2 can be programmed to be an 8-bit channel.

Figure 4:
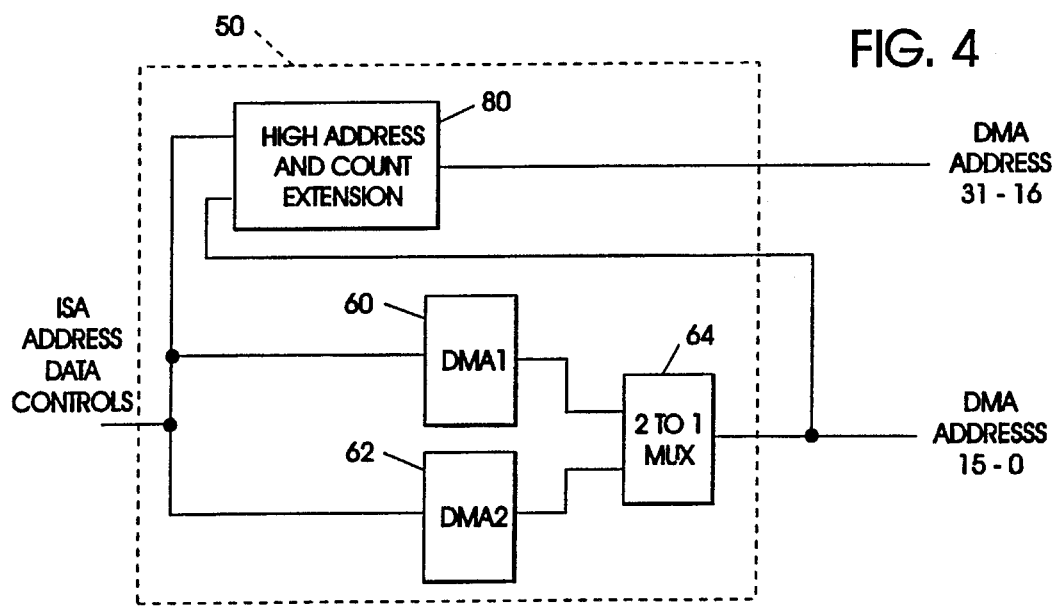
FIG. 4 is a basic block diagram of a DMA control circuit constructed in accordance with an embodiment of the present invention having high address extension and high count extension logic.

The circuitry of FIG. 3 provides the lower 16 bits of a memory address. The upper 16 bits (31:16) are produced by high address and high count extension logic 80, as shown in the basic block diagram of FIG. 4. The logic 80 also produces a count extension by providing the upper 8 bits (23:16) of a 24-bit transfer count, which in the prior art has been limited to 16 bits. The logic 80 can be considered as part of the DMA controller circuit 50 or a separate unit.

Figure 5B:
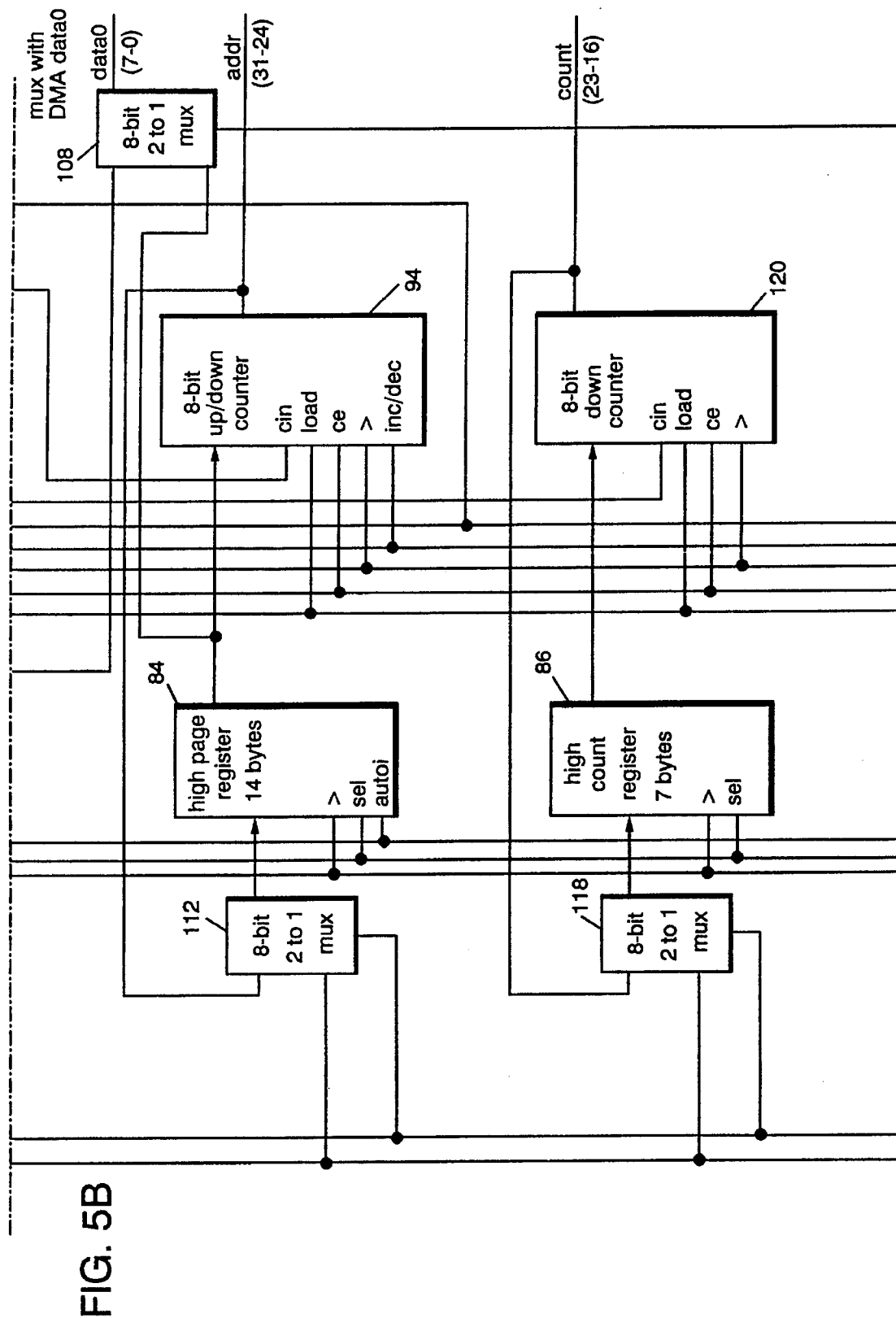
Figure 5C:
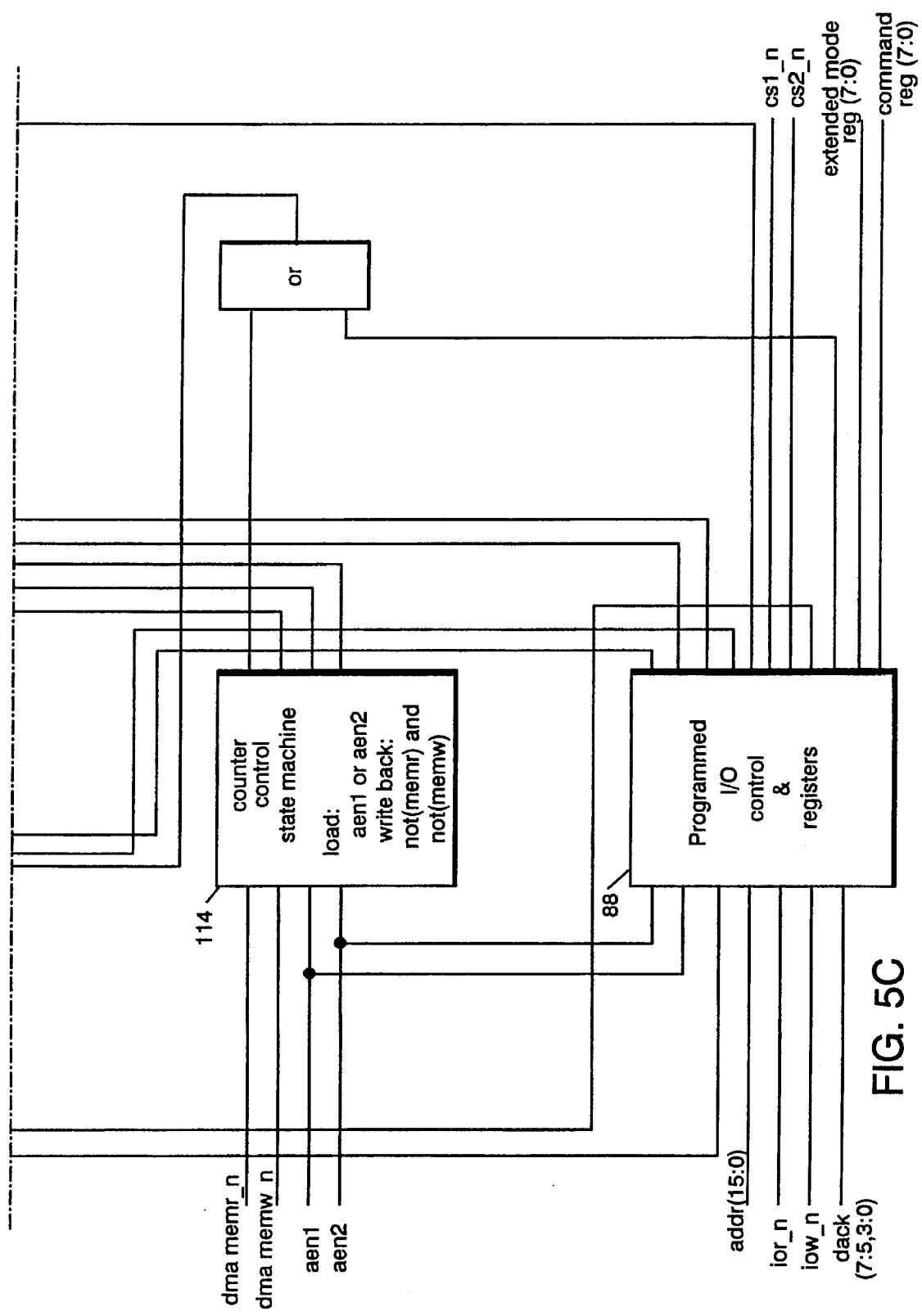

FIG. 5 is a block diagram of an exemplary embodiment of the high address and high count extension logic 80. The logic 80 includes a low page register 82, a high page register 84, and a high count register 86. The low page register 82 has been used in prior art designs (such as the IBM PC/AT) to provide another eight (8) bits of memory addressing capability, for a total of twenty-four (24) bit addressing capability, or 16 megabytes. The high page register 84 of the present invention provides an additional eight bits of memory addressing capability for a total of thirty-two (32) bit addressing capability, or 4 gigabytes. These additional 8 bits are sent to the PCI bus 30 (concatenated with the lower 24 bits of the memory address) by the high page register 84 when an ISA bus master 36 gains control of a DMA channel. The contents of the high page register 84 can be loaded with different values for each of the seven different DMA channels, so that the seven ISA bus masters 36 are able to access seven different 16 megabyte segments of memory within the 4 gigabytes of memory on the PCI bus 30. The high page register 84 is programmable, so that the allocation of a specific memory location for a 16 megabyte segment for an individual ISA bus master 36 can be changed.

The addition of a high page register to the existing design of a DMA controller circuit used in the IBM PC/AT computer system extends DMA transfer addresses from 24 bits to 32 bits, and all these bits may increment as well. This will be described below, as well as the features which allow incrementing and decrementing across any boundary. This was not possible in the original IBM PC/AT design, although it uses a low page register. Before describing the details of the logic 80, the concept of boundary crossing will be explained.

Assume that the starting address of a DMA transfer is 1. When a DMA controller is in an "increment" mode, the next DMA transfer will access address 2. Similarly, a DMA controller can decrement the address on subsequent transfers. However, in prior art devices such as the IBM PC/AT, the address could not be incremented or decremented across "boundaries". A boundary is located between bytes of an address, for example, such as between bits 15 and 16, and bits 23 and 24. When in the increment mode the next address causes the bits below a boundary (for example, bits 15:0) to become all zeros, and a 1 to enter the bit above the boundary (bit 16), the boundary has been crossed. In the IBM PC/AT design, the lower 16 bits can increment across boundaries, but the next 8 bits (23:16) cannot do so. Because of this limitation, the maximum number of transfers that can be performed in a PC/AT compatible system is 64K bytes for each transfer request. After 64K bytes have been transferred, if the starting address was originally zero, the same memory location would be re-accessed by the next address.

Now referring to FIG. 5, the CPU 41 initially programs the registers of a Programmed I/O control and registers unit 88 (hereinafter "PIO 88") with the starting address, the transfer count and the mode. This information in the registers of the PIO 88 provides the DMA controller circuit 50 with the information it needs to perform a transfer. The PIO 88 and the high address extension architecture basically decode the address and I/O read and write commands to detect when to read or write several of the internal registers inside the first and second DMA controllers 60, 62 and the external registers for the DMA controller circuit 50. The PIO 88 also generates chip select signals to the first and second DMA controllers 60, 62 for address decodes.

The chip select 1 signal is received at the chip select input of the first DMA controller 60. The chip select 2 signal is received at the second DMA controller 62. The chip select signals are asserted for cycles accessing the registers in the respective DMA controller 60, 62. Inside the PIO 88 are extended mode registers which are extensions to the mode registers inside the DMA controllers 60, 62. The extended mode register is an 8-bit register. Five of the bits contain information which indicates to the DMA controllers 60, 62 whether the channel an 8- or 16-bit channel (see register 76 in FIG. 3), and whether the transfer will be a compatible cycle or a faster version. The PIO 88 receives the acknowledge DACK signals which are used to select the values to read out of the high and low page registers during DMA transfers and ensure that the correct channel information is routed to the address bus.

The low page register 82 contains 14 bytes of information. It contains the base address register for all seven channels, i.e. 7 bytes, and the current address register for all seven channels, another 7 bytes. When the low page register 82 is programmed, both the base and the current address registers are written simultaneously. As the DMA controller circuit 50 performs its transfer, the current address register in the low page register 82 is updated at the end of each writeback cycle.

The base address remains the initial value that was programmed in the base address register. This value supports a DMA mode termed "auto-initialize" in which upon completion of a DMA transfer, the base contents are restored to the current register and the same transfer can then proceed once again.

The high page register 84 is constructed essentially the same as the low page register 82. The high page register 84 contains the high page information for base and current addresses and an associated multiplexer to steer the data out.

An 8/7 bit up/down counter 90 is the counter for address bits 23–16 and is loaded by the low page register 82 upon initiation of a DMA transfer and drives address bits (23–16) out onto the bus. Bit 16 passes through a multiplexer 92, so that the only bit that is actually multiplexed is bit 16. The 8/7 bit counter 90 acts as a 7 bit counter when the DMA controller circuit 50 is in a 16-bit address shifted mode and the high page register has been programmed. In this mode, the counter 90 counts in a manner that accounts for the fact that the least significant bit of the address is now being driven up from the lower 16 bits by shifting.

In order to provide IBM PC/AT compatibility, in unshifted operation, the 8/7 bit up/down counter 90 operates as a conventional 8 bit counter, since the least significant bit of the address is not being driven up from the lower 16 bits. When the low page register 82 is accessed, the high page register 84 is cleared (all zeros placed into the register 84) and counting of the high address extension is disabled. The accessing of the lower order addresses or counts places "ff" into the high count register 86. These actions cause the DMA control circuit 50 to operate and appear to the other devices as a PC/AT compatible DMA control circuit. The accessing of the high page register 84 automatically changes the DMA control circuit 50 from the PC/AT compatible mode to the high address extension mode in which high address counting is enabled.

A high page 8-bit up/down counter 94 is loaded with the contents of the high page register 84 upon initiation of the DMA transfer or cascade operation. Both the 8-bit up/down counter 94 and the 8/7-bit up/down counter 90 are cascaded with a carry-out bit. The 8/7 up/down counter carry-out bit feeds into the carry-in of the 8-bit up/down counter 94 to propagate counts across address boundaries. The carry-in to the 8/7-bit up/down counter 90 is driven by a 4-to-1 multiplexer 96 of boundary crossing detection logic 98.

The up/down counters 90, 94 can also be referred to as "address counters".

The 4-to-1 multiplexer 96 selects its output in dependence on whether the DMA controller circuit 50 is in 8-bit mode or 16-bit mode and whether it is incrementing or decrementing. The signals entering the AND gates 100–106 driving the multiplexer 96 are the address bits from the first and second DMA controllers 60 and 62, i.e., the lower 16 bits of the address.

When the DMA is in an increment count by bytes mode, i.e. an increment by 8-bit mode, the first AND gate 100 of the multiplexer 96 is sampled. If "ff" (hexadecimal) is sampled, this indicates to the DMA controller circuit 50 that the address is about to cross a boundary upon a completion of the current transfer. If the current transfer is to "ffff", the next transfer should then be to 10000. To increment that bit properly, the carry-in bit will now become activated to the 8/7-bit up/down counter 90.

If the DMA controller circuit 50 is presently in the 16-bit mode and an increment mode, the second AND gate 102 is sampled. A boundary will be crossed if the current address is "fffe" because the next address will be 10000. This situation also causes the carry-in to be provided to the 8/7-bit up/down counter 90.

The third input to the multiplexer 90 from the AND gate 104 is sampled when the DMA controller circuit 50 is in the decrement mode and an 8-bit transfer mode (i.e., counting by bytes). When the address is 0000, the next decrement will cross a boundary. A carry is generated to the counter 90 to allow it to decrement properly so that the next count will be "ffff". This causes the 8/7-bit up/down counter 90 to decrement.

The fourth input to the multiplexer 96 from the AND gate 106 is used in the decrement mode and a 16-bit transfer mode. When the lower address ends in '010'b shifted, this indicates to the 8/7-bit up/down counter 90 that there will be a decrement across the 16-bit boundary. Again, a carry is generated to the counter 90 so that the counter 90 will decrement properly across the boundary.

A 2-to-1 8-bit multiplexer 108 selects the contents of the low page register 82 or the contents of the high page register 84. This multiplexer 108 allows programmed I/O reads of these registers 82, 84 and is decoded by the PIO 88.

Preceding each of the low page and the high page registers 82, 84 is an 8-bit 2-to-1 multiplexer 110,112. The 8-bit 2-to-1 multiplexers 110, 112 selects either: the data from the internal system bus of the bridge chip 34 to the DMA controller circuit 50 to write the page registers 82, 84 initially; or the outputs of the up/down counters 90, 94 to do a write back operation to the page registers 82, 84. This allows the current address which has just been incremented to be written back into the page registers 82, 84.

To control this high address extension and high count extension logic 80, a counter control state machine 114 is provided. The state machine 114 loads the contents of the low page and high page registers 82, 84 into the counters 90, 94 when either of the first or second DMA controllers 60, 62 becomes active. The state machine 114 increments those counters 90, 94 upon completion of a transfer cycle. As long as transfer cycles are occurring and the addresses are incrementing, count instructions will be allowed to change the counters if a carry-in is detected from the boundary crossing detection logic 98. If a carry-in is not detected, the counters 90, 94 will not change their state, and so will not change their value. If an address boundary is crossed, the carry-in will be enabled and a count enable will be enabled by the counter control state machine 114 simultaneously to cause the counters 90, 94 to increment or decrement.

Upon completion of a DMA transfer cycle or series of DMA transfer cycles, the contents of the counters 90, 94 are written back into the page registers 82, 84 by the counter control state machine 114. The 8-bit 2-to-1 multiplexers 110, 112 at the inputs of the low page and high page registers 82, 84 are selected by the state machine 114 to use the counter output contents and perform a write back cycle into the low and high page registers 82, 84. This completes the DMA transfer cycle and the current address register is updated.

The 2-to-1 multiplexer 116 receives bit 16 from the first and second DMA controllers 60, 62 as DMA1A16 and DMA2A16. The multiplexer is used to select between these shifted address 16th bits generated from the first or second DMA controller 60 or 62 for purposes of a 16-bit shifted address operation. The output of the multiplexer 116 is provided to the 2-to-1 multiplexer 92 which ultimately is selected to generate bit 16 of the address which is driven externally by the DMA controller circuit 50. This allows the overwriting of bit 16 for 16-bit address shifter compatibility.

The high count register 86 provides a count extension to 24 bits. The operation of this high count register 86 is analogous to the address extension logic in that the same control signals from the counter control state machine 114 control the loading of the high count register 86 and the incrementing of the high count and writing back the high count value to the high count register 86. The high count register 86 contains 7 bytes; only a current count for each of the seven DMA channels is stored.

As with the low and high page registers 82, 84, the high count register 86 is coupled to an 8-bit 2-to-1 multiplexer 118 and an 8-bit down counter 120. A down counter is used since the count is only decremented, and is not incremented.

A signal from the first and second DMA controllers 60 and 62 to an AND gate 122 detects when all internal bits from these controllers 60, 62 are 1 in the 16-bit transfer count. This is the indication to the high counter 120 to decrement.

The count signals are sampled directly to determine when a decrement boundary is going to be crossed in order to clock the high count extension. Unlike the address extension logic which is programmed through the PIO 88, in preferred embodiments, the count extension is only programmable by a scatter gather program. Scatter gather programs are well-known to those of ordinary skill in the art.

With the present invention as described above, an ISA bus master 36 is able to operate in a conventional manner to address 16 megabytes. The accessing of memory above the 16 megabyte limit and the count extension is transparent to the ISA bus masters 36, as it is performed by the bridge chip 34 using the DMA controller circuit 50.

In order to provide backward compatibility, the DMA controller circuit defaults to PC/AT compatible mode, i.e. 16-bit addressing with a low page register. Once the high order byte is programmed, however the DMA controller circuit 50 changes from the default PC/AT mode into a 32-bit mode.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bridge for interfacing the buses of a computer system that has a first bus having M-bit memory addressing capacity and a second bus having N-bit memory addressing capacity, the bridge comprising:

a direct memory access (DMA) controller circuit that generates M-bit memory addresses for DMA transfer operations, the DMA controller circuit including:

a pair of cascaded DMA controllers that generate P bits of the M-bit memory addresses;

address extension logic having a low page register that provides Q bits of the M-bit memory addresses, and a high page register that provides R bits of the M-bit memory addresses, the Q and R bits concatenated with the N bits to form the M-bit addresses, where P+Q+R=M;

logic for incrementing and decrementing the M-bit memory addresses during DMA transfer operations: wherein a boundary exists between the most significant bit of the P bits and the least significant bit of the Q bits, the P bits forming the first and second bytes of the M-bit addresses, the Q bits forming the third byte of the M-bit addresses, and the R bits forming the fourth byte of the M-bit addresses, the first byte being the least significant and the fourth byte being the most significant of the M-bit addresses; and boundary crossing detection logic for detecting when incrementing or decrementing the M-bit addresses will cause a boundary crossing between the second and third bytes.

2. The bridge of claim 1, further comprising counter logic for incrementing and decrementing the Q and R bits of the M-bit addresses such that bits from the P bits cross the boundary when the boundary crossing detection logic detects that incrementing or decrementing the M-bit address will cause a boundary crossing.

3. The bridge of claim 2, wherein the low and high page registers are coupled to the counter logic and receive incremented and decremented Q and R bits respectively from the counter logic, the low page register having a current address register for storing the Q bits and the high page register having a current address register for storing the R bits.

4. The bridge of claim 1, wherein the pair of cascaded DMA controllers generates a P-bit transfer count, the DMA controller circuit further including count extension logic that provides Q bits that are concatenated with the P-bit transfer count to form a T-bit transfer count, where P+Q=T.

5. A system comprising:

a first bus having M-bit memory addressing capacity;

a second bus having N-bit memory addressing capacity;

a bridge coupled between first and second buses, the bridge having a direct memory access (DMA) controller circuit that generates M-bit memory addresses for DMA transfer operations, the DMA controller circuit including:

a pair of cascaded DMA controllers that generate P bits of the M-bit memory addresses;

address extension logic having a low page register that provides Q bits of the M-bit memory addresses, and a high page register that provides R bits of the M-bit memory addresses, the Q and R bits concatenated with the N bits to form the M-bit addresses, where P+Q+R=M;

logic for incrementing and decrementing the M-bit memory addresses during DMA transfer operations; wherein a boundary exists between the most significant bit of the P bits and the least significant bit of the Q bits, the P bits forming the first and second bytes of the M-bit addresses., the Q bits forming the third byte of the M-bit addresses, and the R bits forming the fourth byte of the M-bit addresses, the first byte being the least significant and the fourth byte being the most significant of the M-bit addresses; and boundary crossing detection logic for detecting when incrementing or decrementing the M-bit addresses will cause a boundary crossing between the second and third bytes.

6. The system of claim 5, further comprising counter logic for incrementing and decrementing the Q and R bits of the M-bit addresses such that bits from the P bits cross the boundary when the boundary crossing detection logic detects that incrementing or decrementing the M-bit address will cause a boundary crossing.

7. The system of claim 6, wherein the low and high page registers are coupled to the counter logic and receive incremented and decremented Q and R bits respectively from the counter logic, the low page register having a current address register for storing the Q bits and the high page register having a current address register for storing the R bits.

8. The system of claim 5, wherein the pair of cascaded DMA controllers generates a P-bit transfer count, the DMA controller circuit further including count extension logic that provides Q bits that are concatenated with the P-bit transfer count to form a T-bit transfer count, where P+Q=T.

* * * * *